United States Patent [19]

von Bogdandy et al.

[11] Patent Number: 4,957,547

[45] Date of Patent: Sep. 18, 1990

[54] PROCESS FOR CONTINUOUSLY MELTING OF STEEL

[75] Inventors: Ludwig von Bogdandy, Linz; Gerhard Mitter, Traun; Otto Köller; Luzian Pochmarski, both of Leoben; Christian Jaquemar, Puchenau, all of Austria; Hans-Jürgen Langhammer, Platjenwerbe, Fed. Rep. of Germany

[73] Assignee: Voest-Alpine Stahl Donawitz Gesellschaft mbH, Leoben-Donawitz, Austria

[21] Appl. No.: 256,410

[22] Filed: Oct. 12, 1988

[30] Foreign Application Priority Data

Oct. 13, 1987 [AT] Austria .................................. 2709/87
Dec. 10, 1987 [AT] Austria .................................. 3247/87

[51] Int. Cl.$^5$ .............................................. C21B 5/36
[52] U.S. Cl. ........................................ 75/567; 75/568; 75/571
[58] Field of Search ................... 75/30, 257, 46, 51.2, 75/55, 58

[56] References Cited

U.S. PATENT DOCUMENTS 2,546,936  3/1951  Vignos ..................... 75/24
4,695,318  9/1987  Knauss, Jr. et al. ........ 75/46
4,726,839  2/1988  Berger et al. ............. 75/46

*Primary Examiner*—Melvyn J. Andrews
*Attorney, Agent, or Firm*—Cushman, Darby & Cushman

[57] ABSTRACT

A process for continuously melting steel from largely already reduced iron containing material such as pig iron and/or scrap iron, in which process the melt is poured into a ladle for performing subsequent metallurgical steps. The metallurgical slag is, by adding flux, adjusted to 20–77.2% FeO, preferably 25.7–50% FeO
10–30% $SiO_2$
2–15% $Al_2O_3$
5–20% MgO
0.13–6.45% MnO, perferably 0.5–5% MnO
1–10% CaO
0.1–5% $Cr_2O_3$
P+S traces.

14 Claims, No Drawings

PROCESS FOR CONTINUOUSLY MELTING OF STEEL

BACKGROUND OF THE INVENTION

1. Field of the Invention

The invention relates to a process for continuously melting steel from largely already-reduced iron-containing materials such as pig iron and/or scrap iron, in which process the melt is poured into a ladle for performing subsequent metallurgical steps.

2. Description of the Prior Art

For producing steel from solid metallic iron containing material, in particular scrap iron, solid pig iron, pellets, iron sponge or mixtures thereof, there are used, as a rule, oxygen inflation converters or oxygen sparging converters carbon-containing fuels are blown into the melt for obtaining the required melting heat. The production of steel from scrap without using liquid pig iron can be achieved without substantial problems in electric-arc furnaces, the expenditure for electrical energy being in these cases, however, relatively great, so that the economy of such processes is scarcely existent. In known converter processes, in which oxygen is blown onto or through the melt it is, as a rule, possible to operate more rapidly and at more favourable costs. Such melting processes result, however, in relatively high contents of oxides within the melting bath and the slag resulting from using such processes has, as a rule, a relatively high viscosity. Such highly viscous slags have most frequently an insufficient gas permeability, so that strong foaming of the bath and occasionally overboiling of the bath may occur.

SUMMARY OF THE INVENTION

The invention now aims at performing the process in a melting procedure of the initially mentioned type such that excessive boiling reactions are avoided and the risk of foaming of the bath is substantially reduced. The process according to the invention further aims at facilitating the subsequent refining step and, respectively, subsequent metallurgical steps within a ladle when using a steel bath which has been made molten in the above mentioned manner and in improving the yield in iron from the ladle. For solving this task, the process according to the invention essentially consists in that the metallurgical slag is, by adding fluxes, adjusted to 20–77.2% FeO, preferably 25.7–50% FeO
10–30% $SiO_2$
2–15% $Al_2O_3$
5–20% MgO
0.13–6.45% MnO, in particular 0.5–5% MnO
1–10% CaO
0.1–5% $Cr_2O_3$
P+S traces.

On account of adjusting a metallurgical slag of this composition, it has surprisingly been found that, beside the known change of the viscosity by varying the slag composition, also the mechanical gas permeability can be influenced in a favourable manner. In contrast to expectation, it has been found that foaming of the slag in gas-forming metallurgical reactions can be suppressed when adjusting the slag to the composition mentioned above. Such a slag is furthermore a premise for performing subsequent metallurgical steps, such as exothermic reactions and/or an exact adjustment of definite Si-contents within the steel bath.

Fe and Mn are mainly contained within the slag as their monooxides FeO and MnO, respectively.

For the purpose of pouring the melt into a ladle, it is of substantial advantage if it is possible to adjust intended temperatures within the steel melt and within the metallurgical slag. For the purpose of adjusting definite temperatures, it is known to utilize silicothermic reactions in which the required temperature increases can be achieved by using FeSi. To be in the position to perform such silicothermic reactions without any risk of overboiling and without the risk of giving rise to an excessive boiling reaction, it is of substantial importance to provide a metallurgical slag which is adjusted in its viscosity and in its mechanical gas permeability also to subsequent silicothermic steps. When working according to the inventive process, it is thus of particular advantage if the later procedure is such that exothermically reacting additions, such as, for example, Si, Al or exothermically reacting alloys, are added to the melt when pouring the melt into the ladle. On account of the slag treatment proposed according to the invention and on account of the slag composition mentioned above, it is now possible to process great amounts of slag in a technically adoptable ladle volume, thereby avoiding the risk of over-flowing the ladles.

In a particularly simple manner, it is possible to use, when performing the process according to the invention, as the fluxes, compounds selected from the system FeO—MgO—$SiO_2$, such as, for example, Olivines or Pyroxenes. The preferred fluxes are Forsterite, Mg-Orthosilicate or Fe-Orthosilicate. In this manner, there results a definite influence on the viscosity and on the melting point of the slag, thereby simultaneously obtaining a high gas permeability which reduces foaming of the slag within the ladle. Compounds of the system FeO—MgO—$SiO_2$, for example Olivines or Pyroxenes, have, in their turn, a high melting point. On account of the reaction with acidic slags of very high iron content, there result compounds having melting points approximately within the range of 1100° C. to 1200° C., so that a slag of low viscosity and of high gas permeability is reliably obtained at the usually prevailing temperatures. The use of such fluxes results in substantial advantages as compared with the usual use of fluorspar. Fluorspar equally converts limestone into calcium silicate, but the reaction rate and conversion rate, respectively, is, however, substantially lower than when using, for example, Forsterite. The conversion reaction resulting when using magnesium and iron-Orthosilicates is energetically more favourable and results in a substantially neutral slag, warranting a longer effective life of the claddings. The use of silicates, in particular magnesiumorthosilicate and ironorthosilicate, does, in contrast to the use of fluorspar, not result in the formation of toxic gases being detrimental for the environment.

The use of Forsterite, which in its turn has a high melting point, results, together with $SiO_2$, CaO, FeO and $Fe_2O_3$, in a substantial reduction of the melting point. The heat of mixing can fully be utilized. The reaction with silicon results in further amounts of $SiO_2$, which retards the formation of dicalciumsilicate and results in a monocalciumsilicate of lower melting point.

It is, in particular, in case of excessively refined steel melts having acidic slags of high iron content, that the change of the composition of the slag proposed according to the invention results in the possibility to subsequently perform silicothermic reactions or exothermic reactions, respectively, with an only low tendency to foaming or, respectively, overboiling. Simultaneously, it is possible to relatively precisely preselect the desired temperature and it is possible to perform the process with an only low degree of superheating within the melting furnace prior to pouring the melt into the ladle. In this case, the process is advantageously performed such that CaO is added into the ladle prior to or during the pouring step. The CaO added to the ladle at first or during the pouring step reacts with silicon according to the following equation

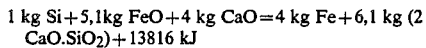

and causes heating of the bath. On account of this reaction, the slag is, on the one hand, heated and, simultaneously, the FeO of the slag being formed during the unavoidable iron combustion within the scrap melting receptacle is, on the other hand, partially reduced again. In this manner, the metal yield is improved. In this case, the metal bath may be mixed by introducing argon through a scavenging block arranged on the ladle bottom for the purpose of substantially homogeneously distributing the heat generated within the slag and for the purpose of avoiding heavy superheating of the slag, which, if it occurred, could result in an attack on the ladle cladding. It is of advantage to use CaO in an amount of 4 to 16 kg per ton metal and to use Si in an amount of 2 to 8 kg per ton metal, so that the silicothermic reaction may take place in an optimum manner. A stoichiometric and quantitative reaction may be achieved if CaO and Si are used in a mass ratio of approximately 4 to 1.

Slags of the following compositions
54% FeO
20% $SiO_2$
7% $Al_2O_3$
8% MgO
3.9% Mn
4% CaO
0.8% $Cr_2O_3$
S+P traces
and
40% FeO
20% $SiO_2$
7% $Al_2O_3$
8% MgO
3.9% Mn
4% CaO
0.8% $Cr_2O_3$
S+P traces
have been found to be of particular advantage.

On account of the slag treatment according to the invention, it is possible to completely adjust the silicon content of the steel bath to the desired values by using FeSi, in particular by using FeSi(75%), noting that it is of advantage to proceed such that a silicon content of 0.15% to 0.40% of the steel melt is adjusted by using FeSi.

As a whole, it is possible to perform the process on account of the slag treatment according to the invention such that pouring of the melt can be effected with only minor superheating, in particular with superheating of 10° to 30° C., noting that solidification of the melt within the ladle is prevented or at least retarded by adding exothermically reacting additions. The metal being superheated for an only minor degree may flow out of the scrap melting receptacle with a superheating of 10° to 30° C. and may be poured into the receiving ladle together with the slag being rich in FeO. The receiving ladle may be preheated to a temperature of 1500° to 1600° C. The desired temperature increase for further secondary metallurgical steps within the ladle provides the possibility to subsequently perform process steps such as a degassing step, an LF-treatment and further refining in a blowing converter with or without the addition of pig iron. During the filling step of the ladle it is possible to gradually add FeSi(75%) and lime or to first introduce lime into the empty ladle and continuously add FeSi (75%).

What is claimed is:

1. A process for continuously producing molten steel, comprising:
   (a) adding to a converter,
      (i) at least one largely already reduced iron-containing material selected from the group consisting of scrap iron, pig iron, iron pellets and iron sponge, and
      (ii) at least one Fe—MgO—$SiO_2$ system flux;
   (b) introducing oxygen and a carbon-containing fuel into the charge comprising the iron-containing material and flux in the converter, thereby producing a melt comprising molten metal in contact with a metallurgical slag having the following composition:
      20–77.2% FeO
      10–30% $SiO_2$
      2–15% $Al_2O_2$
      5–20% Mgo
      0.13–6.45% MnO
      1–10% CaO
      0.1–5% $Cr_2O_3$
      trace P+S;
   (c) pouring the resulting melt into a ladle;
   (d) conducting metallurgical steps on the melt in the ladle and thereby changing said molten metal into molten steel; and
   (e) pouring the resulting molten steel from the ladle.

2. The process of claim 1, wherein:
   in step (a), said flux is added so as to provide said metallurgical slag with the following composition:
      25.7–50% FeO
      10–30% $SiO_2$
      2–15% $Al_2O_3$
      5–20% MgO
      0.5–5% MnO
      1–10CaO
      0.1–5% $Cr_2O_3$
      trace P+S.

3. The process of claim 1, wherein:
   in step (a), said flux is added so as to provide said metallurgical slag with the following composition:
      54% FeO
      20% $SiO_2$
      7% $Al_2O_3$
      8% MgO
      3.9% MnO
      4% CaO
      0.8% $Cr_2O_3$ trace P+S.

4. The process of claim 1, wherein:
   in step (a), said flux is added so as to provide said metallurgical slag with the following composition:
      40% FeO
      20% $SiO_2$
      7% $Al_2O_3$
      8% MgO 3.9% MnO
4% CaO
0.8% Cr$_2$O$_3$ trace P+S.

5. The process of claim 1, further including:
while conducting step (d), adding at least one exothermically reacting material to the melt.

6. The process of claim 5, wherein:
the melt, as poured into the ladle in step (c), exists in a state of being superheated by 10° to 30° C.

7. The process of claim 5, wherein:
said exothermically reacting material is selected from the group containing of Si and Al.

8. The process of claim 1, wherein:
said flux is selected from the group consisting of olivine and pyroxene.

9. The process of claim 1, wherein:
said flux is selected from the group consisting of Forsterite, Mg-orthosilicate and Fe-orthosilicate.

10. The process of claim 1, further including:
adding CaO to the ladle prior to step (c).

11. The process of claim 10, wherein
the CaO is added so as to provide a CaO and Si mass ratio of approximately 4 to 1.

12. The process of claim 1, further including:
adding CaO to the ladle during the step (c).

13. The process of claim 12, wherein:
the CaO is added so as to provide a CaO and Si mass ratio of approximately 4 to 1.

14. The process of claim 1, wherein:
prior to conducting step (e), FeSi is added to the melt in the ladle such as to adjust the content of Si in the melt to 0.15% to 0.40%.

* * * * *